(12) United States Patent
Sugihara et al.

(10) Patent No.: US 12,132,876 B2
(45) Date of Patent: Oct. 29, 2024

(54) IMAGING DEVICE

(71) Applicant: SCREEN HOLDINGS CO., LTD., Kyoto (JP)

(72) Inventors: Yuya Sugihara, Kyoto (JP); Tomoyasu Okushima, Kyoto (JP); Seiya Nomura, Kyoto (JP)

(73) Assignee: SCREEN HOLDINGS CO., LTD., Kyoto (JP)

(*) Notice: Subject to any disclaimer, the term of this patent is extended or adjusted under 35 U.S.C. 154(b) by 0 days.

(21) Appl. No.: 18/458,419

(22) Filed: Aug. 30, 2023

(65) Prior Publication Data

US 2024/0106950 A1 Mar. 28, 2024

(30) Foreign Application Priority Data

Sep. 22, 2022 (JP) ................................. 2022-151591

(51) Int. Cl.
*H04N 1/00* (2006.01)
*H04N 1/40* (2006.01)

(52) U.S. Cl.
CPC ..... *H04N 1/00814* (2013.01); *H04N 1/40068* (2013.01); *H04N 1/00005* (2013.01)

(58) Field of Classification Search
CPC .......... H04N 1/00814; H04N 1/40068; H04N 1/00005; A61B 3/0025; A61B 3/00;
(Continued)

(56) References Cited

U.S. PATENT DOCUMENTS

| 5,124,842 | A | * | 6/1992 | Honda | .................. | H04N 5/262 382/280 |
| 6,850,274 | B1 | * | 2/2005 | Silverbrook | ......... | B41J 2/17513 348/222.1 |

(Continued)

FOREIGN PATENT DOCUMENTS

| EP | 2940982 B1 | 10/2018 |
| EP | 3461115 B1 | 1/2020 |
| JP | 2021-187137 A | 12/2021 |

OTHER PUBLICATIONS

Extended European Search Report issued for the corresponding European patent Application No. 23194206.1 on Jan. 26, 2024.

*Primary Examiner* — Negussie Worku
(74) *Attorney, Agent, or Firm* — Rimon P.C.

(57) ABSTRACT

An object is to provide a technique allowing photographed data acquired by a camera to be converted properly to an image having a resolution necessary for inspection. An imaging device includes a camera, an image data output unit, and an external output signal generator. The camera outputs photographed data obtained by photographing an image on the basis of a camera output signal generated with a constant period. The image is printed on a printing medium transported in a transport direction X. The image data output unit outputs image data based on the photographed data to an inspection device. The external output signal generator generates an external output signal indicating timing of output of the image data by the image data output unit. The image data output unit calculates a weighted average of several pieces of photographed data stored in a buffer while giving respective weights responsive to a time gap between the camera output signal and the external output signal to the several pieces of photographed data.

6 Claims, 5 Drawing Sheets

(58) Field of Classification Search
CPC ......... A61B 3/028; A61B 3/1015; A61B 3/13; A61B 3/14; A61B 3/0041; A61B 5/117; A61B 5/1172; A61B 5/489; A61B 3/103; A61B 5/0059; A61B 5/0062; A61B 5/0075; A61B 5/0261; A61B 5/445; A61B 6/032; A61B 6/037; A61B 6/0407; A61B 6/4411; A61B 6/52; A61B 6/54; A61B 2562/0219; A61B 3/0058; A61B 3/10; A61B 3/102; A61B 3/12; A61B 3/1225; A61B 5/0035; A61B 5/0077; A61B 5/0205; A61B 5/02427; A61B 5/02438; A61B 5/1103; A61B 5/1116; A61B 5/1128; A61B 5/14546; A61B 5/1455; A61B 5/163; A61B 5/6803; A61B 5/7425; A61B 8/4405; A61B 8/463; A61B 8/5261; A61B 90/20; G06F 3/013; G06F 1/14; G06F 1/163; G06F 3/011; G06F 21/32; G06F 17/18; G06F 16/245; G06F 16/24578; G06F 16/3344; G06F 16/583; G06F 16/735; G06F 16/738; G06F 16/7837; G06F 16/787; G06F 21/45; G06F 17/16; G06F 18/22; G06F 18/2321; G06F 18/24; G06F 18/251; G06F 21/602; G06F 3/0346; G02B 2027/011; G02B 2027/0132; G02B 2027/0138; G02B 2027/014; G02B 2027/0178; G02B 2027/0181; G02B 27/017; G02B 27/0172; G02B 7/28; G02B 27/0012; G02B 27/0025; G02B 7/34; G02B 21/0012; G02B 21/22; G02B 21/361; G02B 27/0075; G06T 13/40; G06T 7/0002; G06T 2207/10016; G06T 5/002; G06T 7/73; G06T 2207/10024; G06T 7/33; G06T 2207/10004; G06T 3/00; G06T 3/0093; G06T 5/50; G06T 7/60; G06T 2200/24; G06T 2207/20081; G06T 5/005; G06T 7/44; G06T 2207/30168; G06T 2207/20084; G06T 5/20; G06T 7/90; G06T 3/4038; G06T 7/00; G06T 2207/10032; G06T 3/4007; G06T 5/00; G06T 5/003; G06T 7/0004; G06T 7/0012; G06T 7/11; G06T 7/55; G06T 7/557; G06T 7/85; G06T 2207/10012; G06T 2207/10052; G06T 2207/20024; G06T 2207/30232; G06T 7/13; G06T 7/136; G06T 7/62; G06T 7/70; G06T 1/00; G06T 17/20; G06T 2200/08; G06T 2207/10028; G06T 2207/20212; G06T 7/521; G06T 7/529; G06T 7/586; G06T 7/80; G06T 2207/20016; G06T 2207/20036; G06T 2207/20216; G06T 2207/20221; G06T 2207/30104; G06T 2207/30181; G06T 2207/30188; G06T 2207/30204; G06T 2207/30241; G06T 2207/30252; G06T 5/006; G06T 5/009; G06T 7/246; G06T 7/292; G06T 7/74; G06T 15/20; G06T 17/00; G06T 2200/21; G06T 2207/10044; G06T 2207/10048; G06T 2207/10144; G06T 2207/10152; G06T 2207/20004; G06T 2207/20021; G06T 2207/20056; G06T 2207/20208; G06T 2207/20228; G06T 2207/30108; G06T 2207/30201; G06T 2207/30242; G06T 3/40; G06T 5/007; G06T 5/008; G06T 7/001; G06T 7/10; G06T 7/155; G06T 7/194

USPC ........................................................ 358/1.15

See application file for complete search history.

(56) References Cited

U.S. PATENT DOCUMENTS

| | | | | |
|---|---|---|---|---|
| 7,248,300 | B1* | 7/2007 | Ono | H04N 23/64 |
| | | | | 348/333.03 |
| 10,212,313 | B2* | 2/2019 | Shiohara | H04N 1/6027 |
| 2004/0189819 | A1* | 9/2004 | Saito | H04N 5/772 |
| | | | | 348/222.1 |
| 2010/0033743 | A1* | 2/2010 | Hirai | H04N 1/00002 |
| | | | | 358/1.9 |
| 2014/0210995 | A1* | 7/2014 | Abe | H01L 33/005 |
| | | | | 348/93 |
| 2017/0264791 | A1* | 9/2017 | Shiohara | H04N 5/06 |
| 2017/0264849 | A1* | 9/2017 | Shiohara | H04N 23/80 |
| 2018/0232907 | A1* | 8/2018 | Sung | H04N 17/002 |
| 2018/0316812 | A1* | 11/2018 | Zhao | H04N 1/0009 |
| 2019/0050659 | A1* | 2/2019 | Hwang | G06F 21/32 |
| 2022/0355603 | A1* | 11/2022 | Yamada | B41J 2/32 |
| 2023/0066402 | A1* | 3/2023 | Haruta | G06T 7/001 |
| 2024/0100827 | A1* | 3/2024 | Sugihara | H04N 1/6033 |

* cited by examiner

IMAGING DEVICE

RELATED APPLICATIONS

This application claims priority from Japanese Application No. 2022-151591, filed on Sep. 22, 2022. The entire teachings of the above application are incorporated herein by reference.

BACKGROUND OF THE INVENTION

Field of the Invention

A subject matter disclosed in this specification relates to an imaging device.

Description of the Background Art

Various inspections for printing quality, nozzle check, etc. have conventionally been conducted on the basis of image data obtained by photographing an image printed on a printing medium with a camera while transporting the printing medium in one direction. As an example, according to a statement in Japanese Patent Application Laid-Open No. 2021-187137, an in-line sensor reads a printed matter obtained by printing a test pattern with a recording head to acquire a read image, and recording characteristics of each nozzle at the recording head are acquired using the read image.

SUMMARY OF THE INVENTION

Technical Problem

If a period of photographing by a camera such as a line sensor is constant, photographed data output from the camera has a resolution that depends on a transport speed of a printing medium. For example, reduction in the transport speed reduces a distance the printing medium moves during one photographing, thereby increasing the resolution of the photographed data. Also, increase in the transport speed reduces the resolution of the photographed data. In response to this, it becomes necessary in some cases to perform a process of converting the photographed data output from the line scan camera in conformity with the resolution of an image used for inspection (hereinafter called an "inspection resolution").

An object of the present invention is to provide a technique allowing photographed data acquired by a camera to be converted properly to an image having a resolution necessary for inspection.

Solution to Problem

To solve the above-described problem, a first aspect is intended for an imaging device comprising: a camera that outputs photographed data obtained by photographing an image on the basis of a camera output signal generated with a constant period, the image being printed on a printing medium transported in a first direction; an image data output unit that outputs image data based on the photographed data to an external device; and an external output signal generator that generates an external output signal indicating timing of output of the image data by the image data output unit. The image data output unit includes: a buffer configured to store several pieces of photographed data output from the camera; and an averaging processor that calculates a weighted average of the several pieces of photographed data stored in the buffer using respective weights for the several pieces of photographed data responsive to a time gap between the camera output signal and the external output signal. The image data output unit outputs an image represented by the weighted average calculated by the averaging processor as the image data.

In the imaging device of the first aspect, a weighted average of the pieces of photographed data stored in the buffer is calculated using the weights responsive to the time gap between the camera output signal and the external output signal. By doing so, it becomes possible for the resolution of the photographed data output from the camera to be converted properly to the image data having an intended resolution.

According to a second aspect, in the imaging device of the first aspect, the external output signal generator generates the external output signal on the basis of the amount of transport of the printing medium.

In the imaging device of the second aspect, it is possible to generate the external output signal on the basis of the amount of transport.

According to a third aspect, the imaging device of the second aspect further comprises a transport amount detector that detects the amount of transport, wherein the external output signal generator generates the external output signal on the basis of the amount of transport detected by the transport amount detector.

In the imaging device of the third aspect, even if the resolution of the photographed data changes in response to change in transport speed of the printing medium, it is still possible for the photographed data to be converted to the image data having a necessary resolution.

According to a fourth aspect, in the imaging device of the third aspect, the transport amount detector has a rotary encoder that outputs a pulse signal in response to the amount of rotation of a transport roller for transporting the printing medium, and the external output signal generator generates the external output signal on the basis of the pulse signal.

According to a fifth aspect, in the imaging device of any one of the first to fourth aspects, the camera has a line sensor extending in a second direction intersecting the first direction.

In the imaging device of the fifth aspect, it is possible for the image on the printing medium transported in one direction to be read with the line sensor.

According to a sixth aspect, the imaging device of any one of the first to fifth aspects further comprises a count signal generator that generates a count signal with a period less than the period of the camera output signal, wherein the image data output unit sets the weights on the basis of the number of the count signals generated in the time gap between the camera output signal and the external output signal.

In the imaging device of the sixth aspect, it is possible to set the weights on the basis of the number of the count signals.

These and other objects, features, aspects and advantages of the present invention will become more apparent from the following detailed description of the present invention when taken in conjunction with the accompanying drawings.

DESCRIPTION OF THE PREFERRED EMBODIMENTS

A preferred embodiment of the present invention will be described below by referring to the accompanying drawings. Constituting elements in the preferred embodiment are described merely as examples, and the scope of the present invention is not to be limited only to these elements. To facilitate understanding, the size of each part or the number of such parts in the drawings may be illustrated in an exaggerated or simplified manner as needed.

1. First Preferred Embodiment

Figure 1:
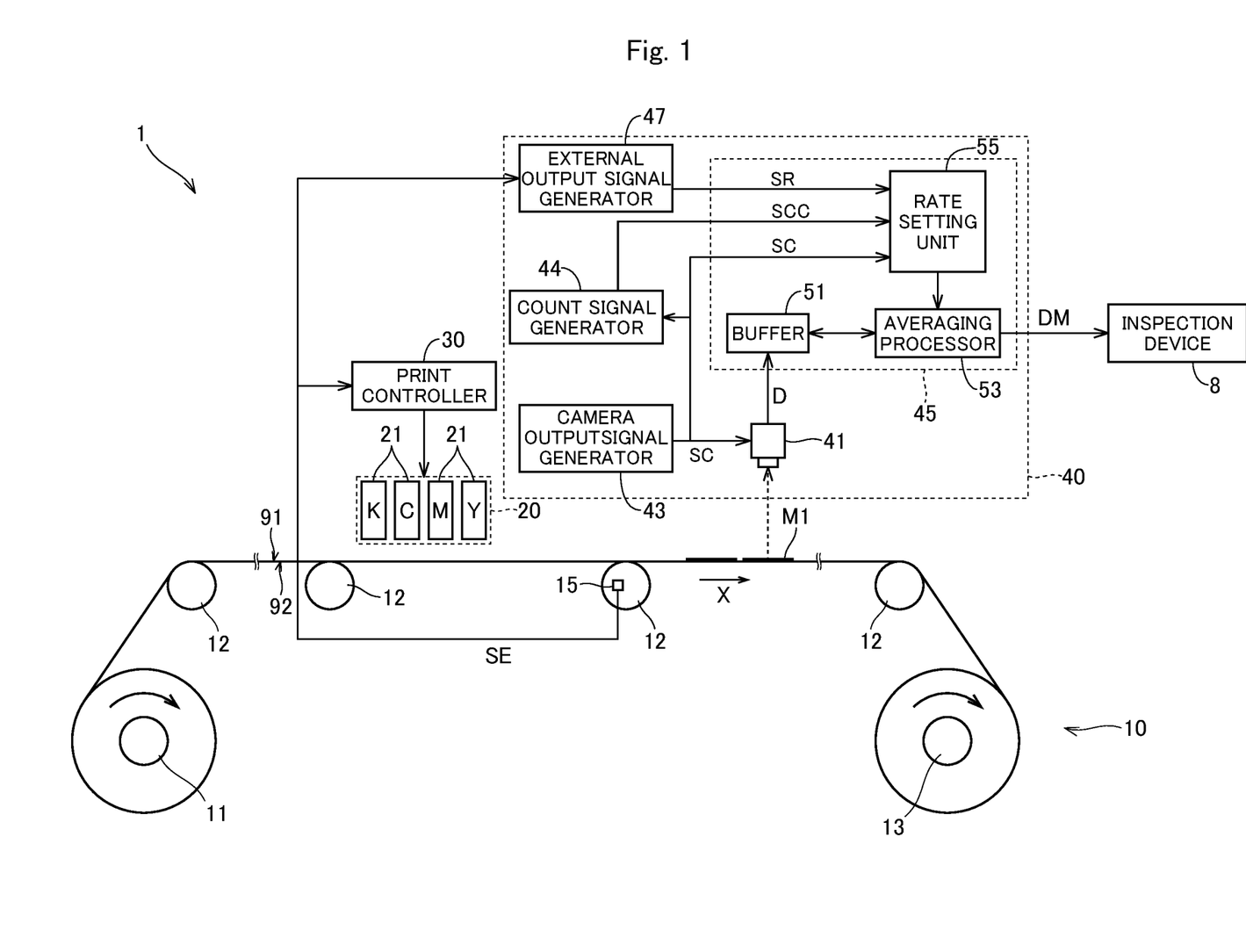
FIG. 1 shows a printing apparatus according to a preferred embodiment.

FIG. 1 shows a printing apparatus 1 according to the preferred embodiment. The printing apparatus 1 forms an image on a printing surface 91 of a printing medium 9 by ejecting droplets of ink (hereinafter called "ink droplets") to the printing medium 9 by the inkjet method. In this example, the printing medium 9 has an elongated strip shape (web shape). The printing medium 9 is printing paper, a film made of resin, or metal foil, for example. As shown in FIG. 1, the printing apparatus 1 includes a transport section 10, a printing section 20, a print controller 30, and an imaging device 40.

The transport section 10 continuously transports the printing medium 9 downstream from an upstream side along a prescribed transport path in a roll-to-roll system. More specifically, the transport section 10 includes a feed roller 11, a plurality of transport rollers 12, and a take-up roller 13. The feed roller 11, each of the transport rollers 12, and the take-up roller 13 are each rotatable about an axis parallel to a width direction Y of the printing medium 9.

The feed roller 11 continuously feeds the printing medium 9 wound in a roll shape on an outer peripheral surface of the feed roller 11. The transport rollers 12 are located at respective prescribed positions on the transport path. The printing medium 9 fed from the feed roller 11 is supported by each of the transport rollers 12 from a back surface 92 on the opposite side to the printing surface 91. The printing medium 9 wound around each of the transport rollers 12 is taken up in a roll shape and collected by the take-up roller 13.

The transport section 10 includes a rotary driving part such as a motor for rotating the take-up roller 13. The transport section 10 may include a rotary driving part for rotating the feed roller 11 or for rotating some or all of the transport rollers 12.

The transport section 10 includes a transport amount detector 15. The transport amount detector 15 detects the amount of transport (transport distance) of the printing medium 9 in a fixed length of time. More specifically, the transport amount detector 15 has a rotary encoder. The rotary encoder detects the amount of rotation (rotation angle) of the transport roller 12. Each time the transport roller 12 rotates a predetermined angle, the rotary encoder of the transport amount detector 15 outputs a pulsed encoder signal SE.

Using the rotary encoder is not the only method of detecting the amount of transport of the printing medium 9. For example, marks recorded on the printing medium 9 at a predetermined interval may be read using a camera, and the amount of transport of the printing medium 9 in the predetermined length of time may be calculated on the basis of moments when the marks are read.

The printing section 20 prints an image on the printing surface 91 of the printing medium 9 transported in one direction (a transport direction X indicated by an arrow in FIG. 1) by the transport section 10. The printing section 20 includes a plurality of printing heads 21 that eject ink droplets. In this example, these printing heads 21 include a printing head 21 for ejection of ink droplets of black (K), a printing head 21 for ejection of ink droplets of cyan (C), a printing head 21 for ejection of ink droplets of magenta (M), and a printing head 21 for ejection of ink droplets of yellow (Y) that are arranged in this order in the transport direction X while spaced from each other.

The color of the ink ejected from each of the printing heads 21 is freely changeable. Additionally, the printing section 20 may include a printing head 21 that ejects ink droplets of a color differing from K, C, M, and Y. Moreover, the number of the printing heads 21 of the printing section 20 may be one.

The printing head 21 has a surface facing the printing surface 91 of the printing medium 9 and provided with a plurality of ejection nozzles (not shown in the drawings) through which ink droplets are ejected. These ejection nozzles are arranged in the width direction Y perpendicular to the transport direction X. Ink droplets can be ejected from the printing head 21 to a range (printable range) covering an entire area of the printing medium 9 in the width direction Y. The printing apparatus 1 is so-called a single-pass (one-pass) printing apparatus that prints an image M1 on the printing medium 9 by ejecting ink droplets from each of the printing heads 21 while the printing medium 9 passes through under the printing heads 21 only once.

The print controller 30 controls the printing section 20. The print controller 30 is a computer including a processor such as a CPU, a memory such as a RAM, and an auxiliary storage such as a hard disk drive, for example. The print controller 30 may be composed of a dedicated electronic circuit such as an application-specific semiconductor integrated circuit (ASIC).

The print controller 30 controls ejection of ink droplets from each nozzle of each of the printing heads 21 on the basis of print data indicating an image to be printed on the printing medium 9 and the amount of transport of the printing medium 9 (the encoder signal SE output from the transport amount detector 15).

The imaging device 40 photographs the image M1 printed on the printing medium 9, and outputs image data DM to an inspection device 8 as an external device. The inspection device 8 is a device that determines whether the image M1 is printed correctly by comparing the image data DM output from the imaging device 40 with a reference image, for example. The inspection device 8 may also be a device that determines the presence or absence of density irregularity or a hue in the image M1. The imaging device 40 includes a camera 41, a camera output signal generator 43, a count signal generator 44, an image data output unit 45, and an external output signal generator 47. The image data output unit 45 includes a buffer 51, an averaging processor 53, and a rate setting unit 55.

The camera 41 is a line scan camera having a line sensor extending in the width direction Y. The line sensor is composed of a plurality of imaging elements arranged in a single line in the width direction Y. The imaging elements are CCDs or CMOSs. The camera 41 reads the color of an image on the printing medium 9 optically using the line sensor, and outputs photographed data D indicating an image in which the read color is expressed in RGB color space to the buffer 51. The photographed data D is data indicating a brightness value of each of the colors R, G, and B corresponding to one line, for example.

The camera output signal generator 43 generates a pulsed camera output signal SC with a constant period T1. As shown in FIG. 1, the camera output signal SC is input to each of the camera 41, the count signal generator 44, and the rate setting unit 55 of the image data output unit 45.

The count signal generator 44 generates a count signal SCC. The count signal SCC is a pulsed signal generated with a constant period. Preferably, the period of the count signal SCC is less than half of the period T1 of the camera output signal SC.

In this example, the count signal generator 44 generates the count signal SCC on the basis of the camera output signal SC. The count signal generator 44 generates the count signal SCC by multiplying the camera output signal SC (in this example, by 8). The count signal SCC is input to the rate setting unit 55 of the image data output unit 45.

The count signal SCC is not always required to be generated on the basis of the camera output signal SC. Specifically, the count signal SCC may be a signal generated independently of the camera output signal SC.

The camera 41 performs photographing on the basis of the camera output signal SC, and outputs the resultant photographed data D to the buffer 51. For this reason, the camera 41 performs photographing and makes output with the period T1. An exposure duration during which the camera 41 performs photographing coincides with the period T1, for example.

The image data output unit 45 outputs the image data DM based on the photographed data D to the inspection device 8 as an external device. As will be described later, the image data DM is data obtained by calculating a weighted average of several pieces of the photographed data D.

The external output signal generator 47 generates a pulsed external output signal SR defining timing for the image data output unit 45 to output the image data DM. The external output signal generator 47 generates the external output signal SR on the basis of the encoder signal SE output from the transport amount detector 15. The external output signal SR is input to the rate setting unit 55.

The external output signal SR is timed to be generated in response to a resolution necessary for inspection at the inspection device 8 (inspection resolution). More specifically, the external output signal SR is generated each time the printing medium 9 moves a distance corresponding to one pixel indicated by the inspection resolution. If the inspection resolution is 600 dpi, for example, a distance corresponding to one pixel is 42.3 µm (=25.4 mm/600). In this case, the external output signal generator 47 generates the external output signal SR each time the printing medium 9 moves 42.3 µm. The encoder signal SE output from the transport amount detector 15 may be matched with the external output signal SR. In this case, the encoder signal SE is available as it is as the external output signal SR.

The image data output unit 45 includes the buffer 51, the averaging processor 53, and the rate setting unit 55. The buffer 51 is a semiconductor memory, for example, and is configured to temporarily store several pieces of the photographed data D output from the camera 41. The averaging processor 53 generates the image data DM by calculating a weighted average of several pieces of the photographed data D stored in the buffer 51 using respective weights for the several pieces of the photographed data D responsive to a time gap between the camera output signal SC and the external output signal SR. The rate setting unit 55 sets the weights to be used by the averaging processor 53 in calculating the weighted average.

Each of the camera output signal generator 43, the count signal generator 44, the external output signal generator 47, the averaging processor 53, and the rate setting unit 55 is configured using hardware composed of a logic circuit such as a dedicated circuit. The function of each of these units may be realized by software by causing a general-purpose processor such as a CPU to execute a program.

Figure 2:
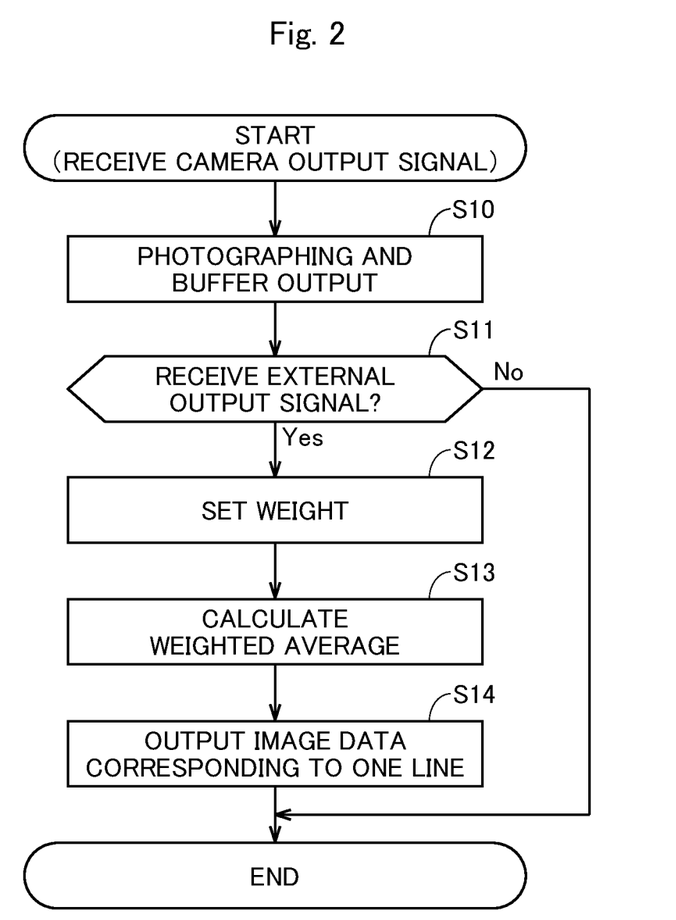
FIG. 2 shows a flow of processes performed by a camera and an image data output unit according to the preferred embodiment in response to receipt of a camera output signal.

FIG. 2 shows a flow of processes performed by the camera 41 and the image data output unit 45 according to the preferred embodiment in response to receipt of the camera output signal SC. First, when the camera 41 receives the camera output signal SC, the camera 41 starts photographing and outputs the resultant photographed data D to the buffer 51 (photographing and buffer output step S10). The rate setting unit 55 of the image data output unit 45 judges whether an additional external output signal SR is received simultaneously with time when the camera output signal SC is received or whether an additional external output signal SR has already been received before the time of receipt of the camera output signal SC (judgment process S11).

If a judgment Yes is made as a result of the judgment process S11, the rate setting unit 55 sets a weight for one or more pieces of the photographed data D stored in the buffer 51 (weight setting process S12). The rate setting unit 55 sets the weight on the basis of a time gap between the time of receipt of the camera output signal SC and the time of receipt of the external output signal SR. If there is no time gap between the time of receipt of the camera output signal SC and the time of receipt of the external output signal SR, the weight is set to 1.

After implementation of the weight setting process S12, the averaging processor 53 calculates a weighted average for each photographed data D (weighted averaging process S13). Specifically, the averaging processor 53 multiplies several pieces of the target photographed data D (more specifically, a brightness value of each of the colors R, G, and B in each target photographed data D) by the respective weights set through the weight setting process S12, obtains a sum of the multiplied pieces, and divides the resultant sum by a total of the weights. By doing so, the averaging processor 53 acquires the image data DM that is the weighted average of the several pieces of the photographed data D.

The averaging processor 53 outputs the image data DM corresponding to one line obtained through the weighted averaging process S13 to the inspection device 8 (external output process S14). Then, the image data output unit 45 finishes the flow.

First Exemplary Operation

Figure 3:
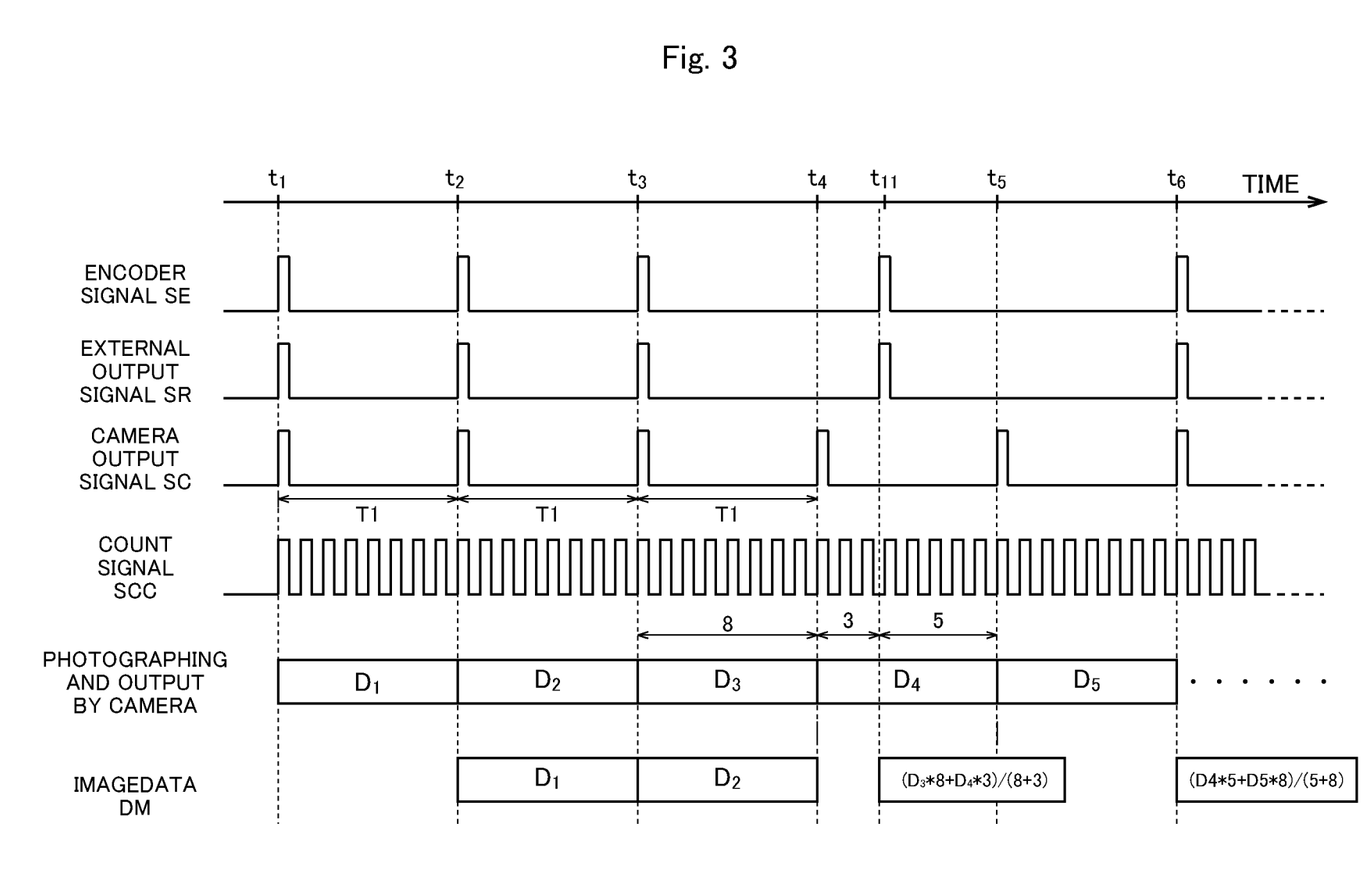
FIG. 3 is a timing chart showing a first exemplary operation by an imaging device according to the preferred embodiment.

FIG. 3 is a timing chart showing a first exemplary operation by the imaging device according to the preferred embodiment. In the illustration of FIG. 3, the external output signal SR is timed to be generated simultaneously with the encoder signal SE. The camera output signal SC is generated at time $t_1$, time $t_2$, time $t_3$, time $t_4$, time $t_5$, and time $t_6$. The camera 41 outputs photographed data $D_1$, photographed data $D_2$, photographed data $D_3$, photographed data $D_4$, and photographed data $D_5$ obtained through photographing to the buffer 51 in response to the camera output signals SC generated at the times $t_1$, $t_2$, $t_3$, $t_4$, and $t_5$ as triggers respectively (photographing and buffer output step S10 in FIG. 2).

The image data output unit 45 receives the external output signal SR at each of the times $t_2$ and $t_3$ simultaneously with the camera output signal SC. Thus, a judgment result Yes is made in the judgment process S11 in FIG. 2. There is no time gap between the time of receipt of the camera output signal SC and the time of the external output signal SR. Accordingly, a weight is set to 1 through the weight setting process S12 in FIG. 2 (weight setting process S12). Next, the image data output unit 45 calculates respective weighted averages of the photographed data $D_1$ and the photographed data $D_2$ in the buffer 51 using the weight 1 as pieces of the image data DM responsive to the external output signals SR at the times $t_2$ and $t_3$ respectively (weighted averaging process S13 in FIG. 2), and then outputs each image data DM externally (external output process S14 in FIG. 2). The photographed data $D_1$ and the photographed data $D_2$ output externally from the buffer 51 are timed to be deleted appropriately from the buffer 51.

At the time $t_4$, the image data output unit 45 does not receive an additional external output signal SR. Specifically, after the time $t_3$ when the external output signal SR is received in response to which the image data DM (image data $D_2$) starts to be output externally from the buffer 51, the image data output unit 45 has not received an additional external output signal SR until the time $t_4$. Thus, at the time $t_4$, a judgment result No is made in the judgment process S11 in FIG. 2 so the flow from the weight setting process S12 to the external output process S14 in FIG. 2 is not followed. As a result, the photographed data $D_3$ stored in the buffer 51 is not output externally.

The image data output unit 45 already receives an additional external output signal SR at time $t_{11}$, which is a moment before the time is when the camera output signal SC is received. In response to this, the image data output unit 45 calculates a weighted average of the photographed data $D_3$ and the photographed data $D_4$ as the image data DM responsive to the external output signal SR at the time $t_{11}$.

Respective weights for the photographed data $D_3$ and the photographed data $D_4$ are set in response to respective photographing durations (exposure durations) of the photographed data $D_3$ and the photographed data $D_4$ in a length of time from the time $t_3$ of receipt of the previous external output signal SR to the time $t_{11}$ of receipt of the target external output signal SR. In this example, the number of the count signals SCC generated in each of the photographing durations is used as the weight.

As an example, the photographing duration of the photographed data $D_3$ is a time difference between the time $t_3$ and the time $t_4$, namely, the period T1. The period T1 corresponds to eight count signals SCC. Thus, the weight for the photographed data $D_3$ is set to "8." Likewise, the photographing duration of the photographed data $D_4$ corresponds to a length of time from the time $t_4$ to the time $t_{11}$ (a time difference between the time $t_4$ and the time $t_{11}$, namely, a time gap between the camera output signal SC and the external output signal SR) and corresponds to three count signals SCC in this case. Thus, the weight for the photographed data $D_4$ is set to "3." As a result, the image data DM responsive to the external output signal SR at the time $t_{11}$ is expressed by the following formula.

$$DM=(D_3*8+D_4*3)/11$$

At the time $t_6$, the image data output unit 45 receives the external output signal SR together with the camera output signal SC. The image data output unit 45 calculates a weighted average of the photographed data $D_4$ and the photographed data $D_5$ stored in the buffer 51 as the image data DM responsive to the external output signal SR at the time $t_6$. Here, a photographing duration of the photographed data $D_4$ to be output corresponds to a length of time from the time $t_{11}$ to the time $t_5$, so that a weight therefor is set to "5." Furthermore, a photographing duration of the photographed data $D_5$ is equal to the period T1, so that a weight for the photographed data $D_5$ is set to "8". As a result, the image data DM responsive to the external output signal SR at the time $t_6$ is expressed by the following formula.

$$DM=(D_4*5+D_5*8)/(5+8)$$

As shown in FIG. 3, reduction in a transport speed of the printing medium 9 increases a time interval between the external output signals SR. Reduction in the transport speed relatively increases the resolution of the photographed data D acquired by the camera 41. In response to this, according to the present preferred embodiment, it is possible to reduce the resolution of the photographed data Din conformity with the inspection resolution by giving respective weights to several pieces of the photographed data D responsive to a time gap between the camera output signal SC and the external output signal SR. This allows the inspection device 8 to conduct inspection properly. If the inspection device 8 is to judge whether an image is printed correctly by comparing a photographed image D with a reference image, for example, the present preferred embodiment allows the photographed image D and the reference image to be compared with each other at a constantly equal resolution independently of a transport speed of the printing medium 9. As a result, it becomes possible to judge the correctness of the printed image stably. This is also true of a case where the inspection device 8 is to determine density irregularity or a hue in the printed image.

As a weight is set on the basis of the number of the count signals SCC, calculation for obtaining a weighted average can be done promptly. Moreover, by setting the period of the count signal SCC less than half of the period T1 of the camera output signal SC (in this example, one-eighth the period T1), it becomes possible to set a weight in which a gap of the external output signal SR from the camera output signal SC is reflected accurately. As a result, error can be reduced between the actually printed image M1 and the image data DM obtained by weighted averaging.

Second Exemplary Operation

Figure 4:
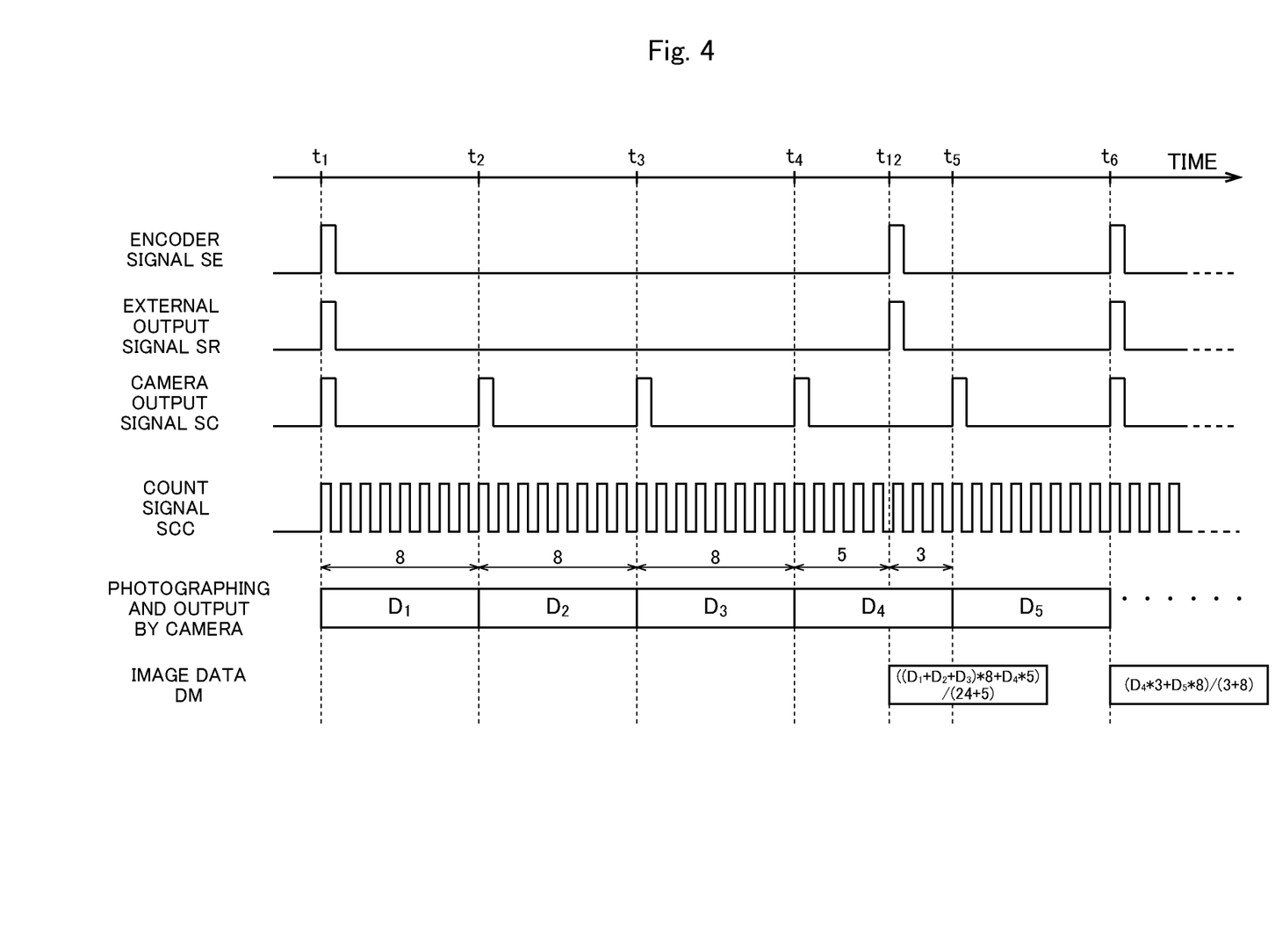
FIG. 4 is a timing chart showing a second exemplary operation by the imaging device according to the preferred embodiment.

FIG. 4 is a timing chart showing a second exemplary operation by the imaging device according to the preferred embodiment. In the illustration of FIG. 4, the external output signal SR is also timed to be generated simultaneously with the encoder signal SE. The camera output signal SC is generated at time $t_1$, time $t_2$, time $t_3$, time $t_4$, time $t_5$, and time $t_6$. In the illustration of FIG. 4, the image data output unit 45 receives the external output signal SR at the time $t_1$, time $t_{12}$, and the time $t_6$. The time $t_{12}$ comes after the time $t_4$ and before the time $t_5$.

At the times $t_2$, $t_3$, and $t_4$, the image data output unit 45 does not receive an additional external output signal SR.

Thus, at each of the times $t_2$, $t_3$, and $t_4$, a judgment result No is made in the judgment process S11 in FIG. 2 so the flow from the weight setting process S12 to the external output process S14 in FIG. 2 is not followed. As a result, photographed data $D_1$, photographed data $D_2$, and photographed data $D_3$ stored in the buffer 51 are not output externally.

At a moment when the camera output signal SC is received at the time $t_5$, the image data output unit 45 already receives an additional external output signal SR at the time $t_{12}$ after the time $t_4$. In response to this, the image data output unit 45 calculates a weighted average of several pieces of photographed data from $D_1$ to $D_4$ stored in the buffer 51 in a length of time from the time $t_1$ to the time is as the image data DM responsive to the external output signal SR at the time $t_{12}$.

More specifically, respective weights for the photographed data $D_1$, the photographed data $D_2$, and the photographed data $D_3$ are set to "8." A weight for the photographed data $D_4$ is set to "5" on the basis of a photographing duration of the photographed data $D_4$ (a length of time from the time $t_4$ to the time $t_{12}$). As a result, the image data DM responsive to the external output signal SR at the time $t_{12}$ is expressed by the following formula.

$$DM=((D_1+D_2+D_3)*8+D_4*5)/(24+5)$$

At the time $t_6$, the image data output unit 45 receives the external output signal SR together with the camera output signal SC. In response to this, the image data output unit 45 calculates a weighted average of the photographed data $D_4$ and photographed data $D_5$ stored in the buffer 51 from the time $t_{12}$ of receipt of the external output signal SR received immediately before and the time $t_6$. More specifically, a weight for the photographed data $D_4$ is set to "3" and a weight for the photographed data $D_5$ is set to "8." As a result, the image data DM responsive to the external output signal SR at the time $t_6$ is expressed by the following formula.

$$DM=(D_4*3+D_5*8)/(3+8)$$

Third Exemplary Operation

Figure 5:
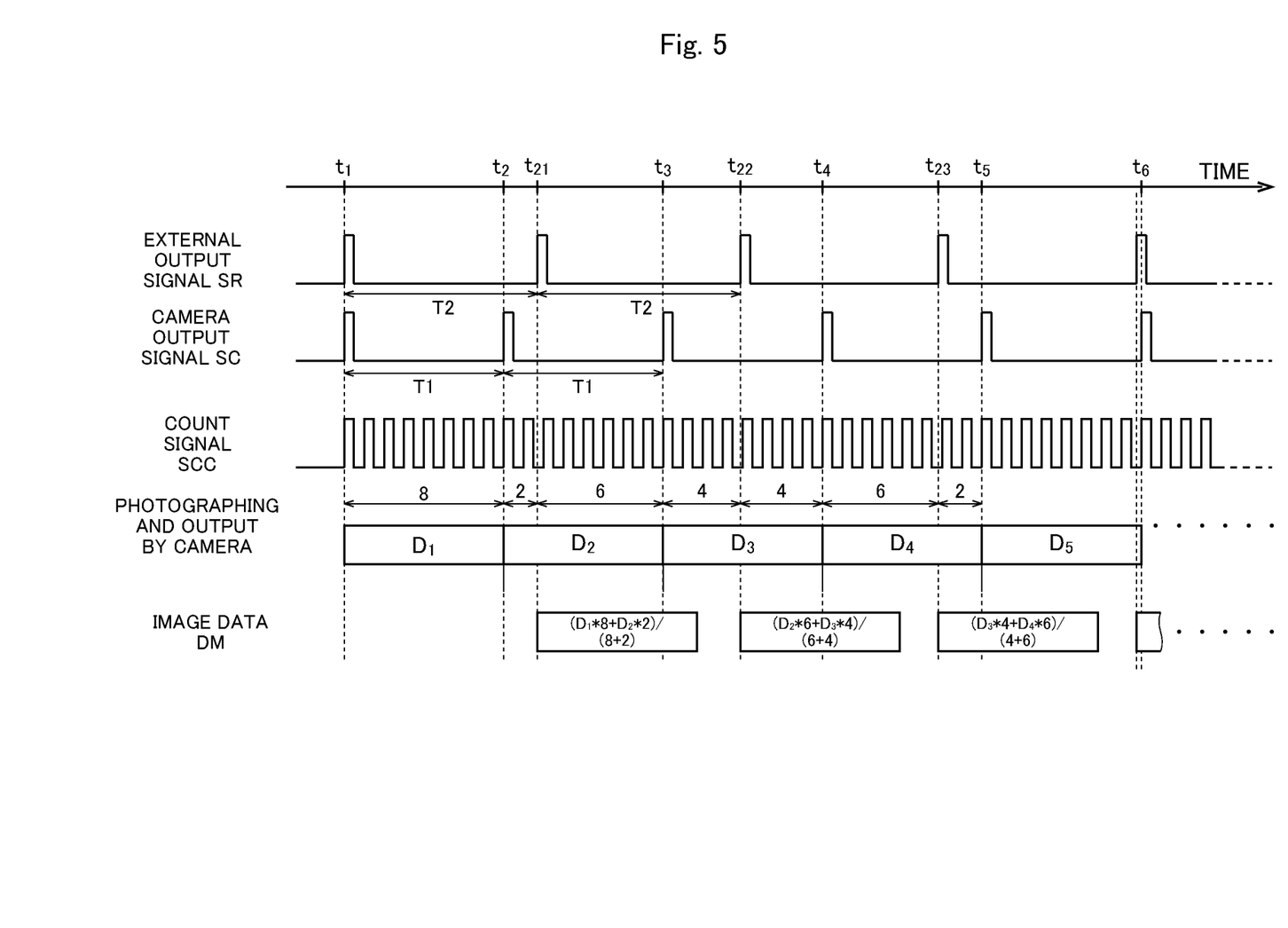
FIG. 5 is a timing chart showing a third exemplary operation by the imaging device according to the preferred embodiment.

FIG. 5 is a timing chart showing a third exemplary operation by the imaging device according to the preferred embodiment. In the illustration of FIG. 5, the external output signal SR is a signal generated with a constant period T2. Specifically, the external output signal SR is not a signal generated on the basis of the encoder signal SE. The period T2 is greater than the period T1. In the illustration of FIG. 5, the image data output unit 45 receives the external output signal SR at each of time $t_1$, time $t_{21}$, time $t_{22}$, and time $t_{23}$.

At time $t_2$, the image data output unit 45 does not receive an additional external output signal SR. Thus, at the time $t_2$, a judgment result No is made in the judgment process S11 in FIG. 2 so the flow from the weight setting process S12 to the external output process S14 in FIG. 2 is not followed. As a result, photographed data $D_1$ stored in the buffer 51 is not output externally.

At a moment when the camera output signal SC is received at time $t_3$, the image data output unit 45 already receives an additional external output signal SR at the time $t_{21}$ after the time $t_2$. In response to this, the image data output unit 45 calculates a weighted average of photographed data $D_1$ and photographed data $D_2$ stored in the buffer 51.

Weights are set by the same method as that described above by referring to FIG. 3. Specifically, the weights are set in response to a photographing duration of the photographed data $D_1$ (from the time $t_1$ to the time $t_2$) and a photographing duration of the photographed data $D_2$ (from the time $t_2$ to the time $t_{21}$) in a length of time from the time $t_1$ of receipt of the external output signal SR received immediately before to the time $t_{21}$ of receipt of the target external output signal SR. In the illustration of FIG. 5, the weight for the photographed data $D_1$ is set to "8" and the weight for the photographed data $D_2$ is set to "2." As a result, the image data DM (weighted average) responsive to the external output signal SR at the time $t_{21}$ is expressed by the following formula.

$$DM=(D_1*8+D_2*2)/(8+2)$$

At a moment when the camera output signal SC is received at time $t_4$, the image data output unit 45 already receives an additional external output signal SR at the time $t_{22}$ after the time $t_3$. In response to this, the image data output unit 45 calculates a weighted average of the photographed data $D_2$ and photographed data $D_3$ stored in the buffer 51 at the time $t_4$. In the illustration of FIG. 5, a weight for the photographed data $D_2$ is set to "6" and a weight for the photographed data $D_3$ is set to "4." As a result, the image data DM (weighted average) responsive to the external output signal SR at the time $t_{22}$ is expressed by the following formula.

$$DM=(D_2*6+D_3*4)/(6+4)$$

At a moment when the camera output signal SC is received at time $t_5$, the image data output unit 45 already receives an additional external output signal SR at the time $t_{23}$ after the time $t_4$. In response to this, the image data output unit 45 calculates a weighted average of the photographed data $D_3$ and photographed data $D_4$ stored in the buffer 51. In the illustration of FIG. 5, a weight for the photographed data $D_3$ is set to "4" and a weight for the photographed data $D_4$ is set to "6." As a result, the image data DM (weighted average) responsive to the external output signal SR at the time $t_{23}$ is expressed by the following formula.

$$DM=(D_3*4+D_4*6)/(4+6)$$

As described above, even in the absence of the encoder signal SE, it is still possible to convert the photographed data D properly to the image data DM having an inspection resolution by generating the external output signal SR with a period responsive to the inspection resolution.

2. Modifications

While the preferred embodiment has been described hereinabove, the present invention is not limited to the foregoing preferred embodiment but can be modified in various ways.

As an example, in the foregoing preferred embodiment, the number of the count signals SCC corresponding to a photographing duration of the photographed data D is used as a weight for the photographed data D. In another case, an actual photographing duration may be calculated and the calculated photographing duration may be used as a weight. In the illustration of FIG. 3, in calculating the image data DM responsive to the external output signal SR at the time $t_{11}$, the period $T_{11}$ (=$t_4-t_3$) may be used as a weight for the photographed data $D_3$ and a length of time from the time $t_4$ to the time $t_{11}$ ($t_{11}-t_4$) may be used as a weight for the photographed data $D_4$, for example.

While the invention has been shown and described in detail, the foregoing description is in all aspects illustrative and not restrictive. It is therefore understood that numerous modifications and variations can be devised without departing from the scope of the invention.

What is claimed is:

1. An imaging device comprising:
a camera that outputs several pieces of photographed data obtained at a constant period by photographing an image on the basis of a camera output signal generated with the constant period, the image being printed on a printing medium transported in a first direction;
an image data output unit that outputs image data based on said photographed data to an external device; and
an external output signal generator that generates an external output signal indicating timing of output of said image data by said image data output unit,
wherein said image data output unit includes:
a buffer configured to store the several pieces of the photographed data output at the constant period from said camera;
a rate setting unit configured to set a weight responsive to a time gap between said camera output signal and said external output signal; and
an averaging processor that calculates a weighted average of said several pieces of photographed data stored in said buffer at the constant period using respective weights set by said rate setting unit, and
wherein said image data output unit outputs an image represented by said weighted average calculated by said averaging processor as said image data.

2. The imaging device according to claim 1, wherein said external output signal generator generates said external output signal on the basis of an amount of transport of said printing medium.

3. The imaging device according to claim 2, further comprising:
a transport amount detector that detects said amount of transport, wherein
said external output signal generator generates said external output signal on the basis of said amount of transport detected by said transport amount detector.

4. The imaging device according to claim 3, wherein
said transport amount detector has a rotary encoder that outputs a pulse signal in response to the amount of rotation of a transport roller for transporting said printing medium, and
said external output signal generator generates said external output signal on the basis of said pulse signal.

5. The imaging device according to claim 1, wherein said camera has a line sensor extending in a second direction intersecting said first direction.

6. The imaging device according to claim 1, further comprising:
a count signal generator that generates a count signal with a period less than the constant period of said camera output signal, wherein
said image data output unit sets said weights on the basis of a number of said count signals generated in the time gap between said camera output signal and said external output signal.

* * * * *